J. E. Hariland,
Sawing Stone.
N° 14,658.                    Patented Apr. 15, 1856.
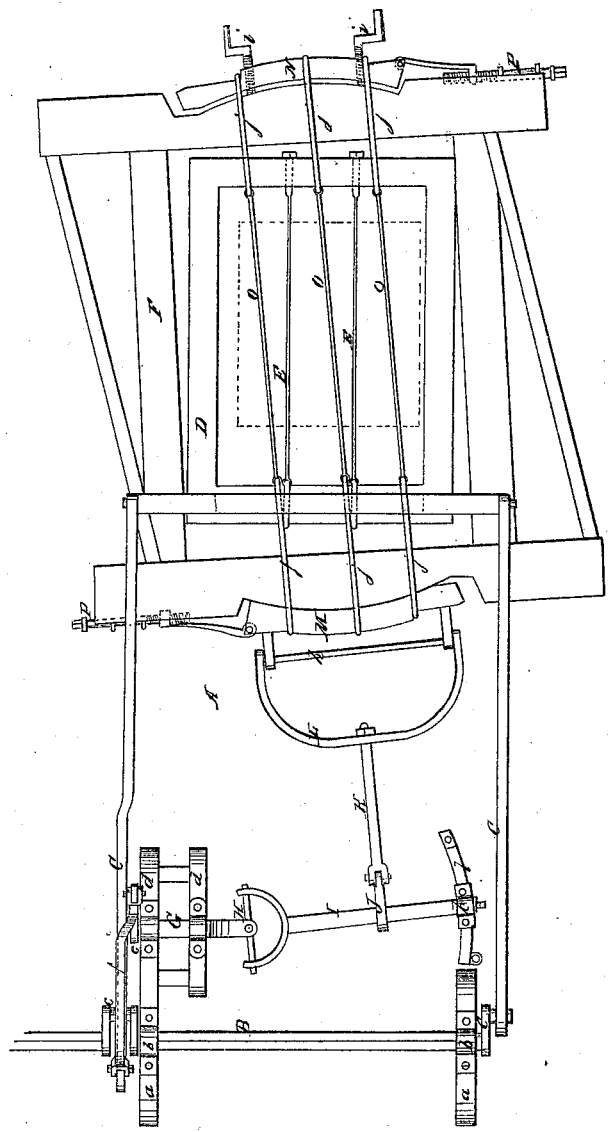

UNITED STATES PATENT OFFICE.

J. E. HAVILAND, OF GALVESTON, TEXAS.

MACHINE FOR SAWING MARBLE IN OBELISK FORM.

Specification of Letters Patent No. 14,658, dated April 15, 1856.

*To all whom it may concern:*

Be it known that I, J. E. HAVILAND, of Galveston, in the county of Galveston and State of Texas, have invented a new and Improved Machine for Sawing Marble Blocks in Polygonal Taper Form; and I do hereby declare that the following is a full, clear, and exact description of the same, reference being had to the annexed drawing, making a part of this specification, said drawing being a plan or top view of my improvement.

To enable those skilled in the art to fully understand and construct my invention, I will proceed to describe it.

A, represents a bed or platform at one end of which two uprights (a) (a), are secured.

B, is a driving shaft which works in suitable bearings (b), (b), on the upper ends of the uprights (a), (a). This shaft has two cranks (c) (c), upon it to which cranks pitmen C, C, are attached one to each. The inner ends of the pitmen C, C, are attached to a horizontal saw frame D, in which saws E, are secured parallel with the sides of the frame D.

F, is a saw frame placed over the frame D, or the frame D, may be described as being within the frame F. The two saw frames are not connected but work independently of each other.

G, is a small shaft which is placed on uprights (d) (d), on the bed or platform A. The shaft G, is parallel with the shaft B, and has a crank (e), on its outer end. This crank is connected by a pitman (f) to the back end of one of the pitmen C. The end of the shaft G, is connected by a universal joint H, to a shaft, I, which has an arm J, attached to it by a set screw. The outer end of the arm J, has one end of a pitman K, attached to the opposite end of said pitman being connected to a bow L, which is attached to a plate M, by a rod (h). The inner side or edge of the plate M, is of concave form, and is fitted over a convex surface on the edge of the cross piece of the saw frame F. The opposite cross piece of said frame is formed in a similar manner and has a plate N, fitted to its convex position by set screws (i), (i).

The saw frame F, has saws O, fitted in it the ends of said saws being connected to loops (j) which pass around the plates M, N. The plates M, N, may be adjusted or shifted upon the convex portions of the end pieces of the saw frame by screw rods, P.

The outer end of the shaft I, works in an adjustable bearing (k), which is fitted on a curved bar (l), on the bed or platform A.

By adjusting the plates M, N, the saws O, may be set obliquely or out of parallel with the saws E, in the frame D, and by shifting the bearing (k), the shaft I, may be adjusted so that the pitman K, may always be in line with the saws O, and the direction of the movement of the frames F.

The saw frames F, D, work between suitable guides and a reciprocating motion is given both saw frames by rotating the shaft B, and the marble block which is placed underneath the saws E, O, which will cut two opposite sides of a block at the same time in taper form, one or more blocks being cut at once according to the number of same employed.

It will be seen that the saw frame D, works in a right line parallel with the sides of the bed or platform and the saw frame F works obliquely with the frame D, sufficient space being allowed between the two frames to permit this.

What I claim as new and desire to secure by Letters Patent, is—

I claim adjusting the saw frame, F, more or less angularly or obliquely with the saw frame, D, by means of the adjustable or sliding plates, M, N, which are fitted over curved surfaces on the cross pieces of the frame, F, substantially as described for the purpose specified.

J. E. HAVILAND.

Witnesses:
J. N. REED,
D. WAKELEE, Jr.